May 23, 1961

W. B. THOMAS 2,984,860

BALLING DRUM

Filed Nov. 24, 1959

INVENTOR.
WALTER B. THOMAS.
BY Thomas J. P. O'Brien.
his ATTORNEY.

United States Patent Office  2,984,860
Patented May 23, 1961

2,984,860

BALLING DRUM

Walter B. Thomas, Pittsburgh, Pa., assignor to Koppers Company, Inc., a corporation of Delaware Filed Nov. 24, 1959, Ser. No. 855,180

6 Claims. (Cl. 18—1)

This invention relates to improvements in rotary drums for pelletizing finely-divided material such as iron ore, ore concentrates, flue dust and fly ash, and more particularly, to improvements in the drum type apparatus of the common assignee's copending Harold T. Stirling application Serial No. 760,265, filed September 10, 1958, now U.S. Patent No. 2,920,344, and entitled "Balling Drum," of which the present improvement is a continuation-in-part.

The main object of the present improvement is to adapt and perfect said Stirling drum apparatus to attain the same result thereof with certain other kinds or sources of material which are so wet or sticky that the material which otherwise could be processed in said Stirling drum system, with the intended movement of the feed material through the drum at a uniform rate, cannot be so processed because of hangups, or excessive buildup on the inside surface of the pelletizer, which causes the material to back up in the feed inlet to the drum, as well as causing undesired larger sized agglomerates to so form in the feed of the drum as to require screening out of a major or substantial portion of the feed at the discharge end before conveying the final product to the sintering system, thus disadvantageously reducing the capacity of the pelletizer system for its intended purpose of once through operation without recycling.

The improved apparatus of said Stirling application is especially designed and adapted for balling said wet or moistened finely-divided material into firm, coherent pellets and balls while devoid of other binders, as well as materials which might have, or require, an agglutinating substance, for the purpose of forming pellets and balls to provide beds of high gas permeability suitable for high-speed sintering of agglomerates into cake form to produce a rigid, firm, dust-free product from the sinter cake.

The Stirling drum system provides a simple, more economical, and facile way of attaining the same throughput or capacity, without recycling of fines, from such rotary drum systems as is attained in the operation of said drums as theretofore with recycling of fines, to nodulize fines without a binder other than water into pellets or balls which give a bed of high gas permeability suitable for sintering into a coherent agglomerated cake mass.

In sintering of the fines in continuous endless conveyor type sintering machines, it is necessary to nodulize or pelletize the fines before laying them onto the sinter strand in order to provide a layer or mass which is permeable to the throughflow of the gas or flame. Most materials can be nodulized with water as the sole binder since they contain inherent properties, such that, when wetted, the balls produced become of such great density, that they retain their shape and the desired bed permeability even after the moisture has been driven off, but some other materials have characteristics which make it necessary to add, in addition to water, an agglomerating agent in order to attain the same effect. Beds so formed give a sintering layer of high premeability which permit high rates of sintering with a minimum of re-runs or hot returns.

With such very high rate of sintering speed, the nodules must be prepared and supplied to the sinter strand as they are freshly formed and at a rate sufficiently fast to maintain the continuity of a sintering layer at all times over the sinter strand.

This has sometimes necessitated in the art prior to said Stirling system, the recycling of a larger portion of fines which might even approach as much as the end product of the rotary drum. As a result of this high volume of fines in such drums to maintain the output of properly sized nodules in the quantity required, much of the fresh, fine material introduced at the inlet of the drums, escapes as fines or as balls or pellets of improper size, which must be classified or screened from the main product leaving the drums for delivery to the sintering machines. The capacity or throughput of these balling drums is thus limited by such fines unless special provisions are taken to recycle these fines back into the feed end of the drum to agglomerate them onto new nodules being formed with the fresh feed material, or as seed particles for initiating the balling action of the fines. When these steps are taken the throughput or capacity of the drums is increased in respect of finished, firm, coherent, nodules suitable to maintain the required continuity of operation of the sinter strand for such agglomerated fines.

In accordance with said Stirling invention, the required throughput or capacity of operation is attained in simpler, more economical, and facile way by means which avoid the discharge of fines from the discharge ends of such drums along with the nodules to be delivered to the sinter strand, thus eliminating the difficulties and disadvantages of recycling fines to attain the rated capacity of the drums.

Accordingly, the said Stirling drum invention provides for this purpose a conventional rotary drum that is operable about a generally horizontal axis, that is at an angle to the vertical, and has radially extending annular baffles that project at spaced intervals along the drum from the inner circumference of the drum toward its axis of rotation in planes at right angles to said axis to provide for simulation in the drum of the tumbling and nodulizing action of the conventional disc pelletizer at repeated intervals along the drum from the feed inlet to the nodule discharge outlet from the drum. Annular deflectors are disposed, each on an incline from a region closer to the axis of rotation on the downstream side of each baffle to a point more remote from the axis of rotation of the drum on the upstream side of a next baffle in the direction of the discharge end of the drum. The baffles are of progressively greater height along the drum from the discharge end toward the feed end, and the spacing between the baffles decrease progressively from the feed end toward the discharge end to provide for longer retention times of the fines in the areas along the drum nearer the feed end than in those areas further along toward the discharge end. Conventional means for feeding wet fine particles are disposed to feed the same to the drum at its end having the wider spaces and the longer baffles, and conventional means for discharge of the nodules are provided at the opposite end of the drum having the shorter baffles.

This simple arrangement of baffles requires a greater portion of the fines to reside in, and remains longer in, the entrance end areas than in the areas further along toward the discharge end until they become more firmly attached as coherent parts of nodules of a size to pass over the baffles before the fine particles can pass from each baffle to the space between it and the next, so that a decreasing amount of fines ultimately reach the after baffles along the drum. As a consequence, only firm coherent nodules reach the discharge end. Screens for classifying the discharge nodules are unnecessary, and recycling steps and equipment eliminated.

A further important feature of the Stirling invention is the angle or pitch of the deflector. A pitch inclusive of 25° and below 50° for the deflectors has been found effective for balling each of the materials of the group of light finely-divided material, fly ash, waste glass grinding effluent, and some kinds of iron ore mixtures, and up to 40° to 50° has been found satisfactory for the heavier material, such as iron ore mixtures. The degree of pitch of these deflector plates will vary according to the physical characteristics and nature of the particular material being processed in the drum. In general, a pitch of 34° has been found effective for best mode of operation in processing each of the aforesaid materials.

In operation with the rotary axis of the drum in a true horizontal plane, the drum operates as a series of pseudo disc pelletizers, without stress or strain, on the bearings as occur with the drum elevated at one end to operate on an incline to the normal or horizontal position. In such horizontal plane, the deflectors function as the incline plane of a disc pelletizer. In the elevated inclined position of the drum, the deflectors may be omitted, since then, the inclined plane of the drum's inner circumference acts to function in the same manner as the rotating inclined plane of a conventional disc pelletizer. However, the deflectors are also utility in such inclined operation of the drum, sine then the greater inclination afforded avoids degradation of the nodules and results in faster throughput with a minimum of fines.

The Stirling invention thus is not limited in all its aspects to the use of deflectors with the radial right angular baffles in increasingly greater depth in direction from the discharge end to the feed end. Also, the decrease in spacing in the direction of the discharge end is not essential to all the aspects of the novel coaction of the invention of such baffle gradation, in reducing the amount of fines reaching the discharge end.

In general, the Stirling system operates satisfactorily with most materials of the type specified, but with others which are very wet or constitute a sticky mix, such as is available at Provo, Utah, the material in the feed end builds up on the scrapers and thus offers resistance to the mix on the inclined deflectors until large lumps form which drop back to the rolling pelletizing area in the lower part of the drum. This material then does not pass on to the next section, but instead, holds back the entering feed choking the inlet means to the drum. The inclined deflectors and their scrapers, which are mounted immovably on a large central rod, collect the mix rather than cause the material to drop freely therefrom to the rolling area. Reciprocable spaced scrapers, and reversely rotating helical members, which would avoid this buildup of the material, cannot be used, since the inclined conical deflectors do not lend themselves to scraping in these manners.

The use of revolving spaced cutting blades, immovable lengthwise of the drum but disposed to advance the material through the drum, as disclosed in the common assignee's copending application of Gordon L. Cox, Jr. and Linwood G. Tucker, Jr., have been found satisfactory to maintain the feed of material at a uniform rate. Because of the high peripheral speed of the cutters, they remain clean and keep the surface of the drum scraped free of excessive material. This system, however, requires maintenance of operation of moving parts.

According to the present invention, it has been found that the cause of the difficulty, was the material being treated, built a heavy clay-like coating on the deflectors and baffles which was not readily continuously removed by stationary scrapers. This material tended to form a clay-like surface that compacts to such extent, that it resembles concrete, producing large lumps that dropped back in the pelletizing area. This also prevented the required uniform rate of flow without hangups and excessive buildup at the feeding end of the drum. By utilizing an immovable cheese cutter type of scrapper for each inclined annular or conical deflector at the feed end of the drum, it has been found that the required uniform rate of flow without hangups or excessive buildup inside the drum on the baffles and deflectors, can be attained also with this sticky mix or excessive wet material in the manner contemplated by the Stirling drum system.

Such cutters are characterized by their hollow shape and this minimizes the resistance to material being scraped and prevents material from collecting on the scrappers. These cutters are characterized by a cutting edge, each corresponding in length and in angle of inclination to its individual annular deflector and each being supported immovably in said operative relation, from a common support extending longitudinally of the drum interior, through secondary support means, each extending individually from the common support transversely out to the respective scrapers and each of a width, lengthwise of the drum, that is but a minor portion of the length of its scraper, to minimize resistance from material scraped off from the annular deflectors by the scrapers and to avoid buildup of the scraped material on the scrapers.

The cutting edges of the scrapers are set at an angle to conform with the angle of the deflector surfaces.

The secondary support means for the scrapers comprise arms disposed at the opposite longitudinal ends of each scraper, with one arm alongside the upstream side of the baffle at the downstream end of the inclined deflectors, and with both arms adjustably mounted on the common support.

With these scrapers, the excessively wet or sticky mix can be processed according to the Stirling system, with the drum tilted and the radial baffles all of the same inside diameter, and also with the drum tilted and the radial baffles progressively decreasing in height toward the discharge end of the drum, as well as with the drum truly horizontal and the radial baffles progressively decreasing in height toward the discharge end, as well as with equal spacing of the baffles and increasing height of the same toward the discharge end. The deflector scrapers may be provided for only the first three deflectors, but preferably, are used adjacent all of the deflectors throughout the entire length of the drum.

Other objects and advantages of the invention will be apparent as it is better understood from the following description when considered in connection with the accompanying drawings illustrating the best mode of practicing the same:

Figure 1 is a top plan view of a rotary drum embodying the best mode of the present invention;

Figure 2 is a vertical longitudinal sectional view of the same taken in lines II—II of Figures 1 and 3;

Figure 3 is a vertical cross-sectional view taken on the line III—III of Figures 1 and 2;

Figure 4 is an enlarged view of a portion of the scrapers taken on line IV—IV of Figure 3 showing mounting for adjustment.

The same reference numerals are used for like parts in each of the several views.

Referring to the drawings, the improved balling drum 10 consists of a cylindrical, smooth inner side shell 11, scrapers 13, a chute feeder 14, an end casing 15 with a bottom discharge outlet 16, lifting scoop supports 19, lifting scoops 19A, and a motor drive 20.

Wet fines and sticky mix are fed to the chute 14 by an endless belt conveyor 21 and the finished nodulized product conveyed from the outlet 16 to the feeder pans or other layering means for a continuous endless strand sintering machine by an endless conveyor 22.

The drum rotates on idler rolls 23 and is driven by the motor 24 through a driving mechanism in the form of a belt 25 and a chain 25' and gearing 26. The scoops 19A are mounted on a supporting truss 27 supported at each end by beams 28. The scrapers 13 are carried by secondary supporting arms 29 supported on the truss 27 as a common support. The arms 29 are interconnected with the truss 27 by shims 30 and slots 30' to adjust the position of the scrapers 13. The scoop bars 19 have scoops 19A thereon in the form of slightly deflected blades or knives at the ends of the bars which tend to shunt the layer materials over into the next baffle section 31. The position of the scoops is adjustable so that the desired shunting action can be obtained to meet the requirements of a particular operating rate. The scoops 19A and the scrapers 13, when adjusted to the baffles 31 and deflectors 32, are then operated in a fixed position relative to the rotating drum 10.

The general aim of the drum is to simulate the action of a conventional disc pelletizer at successive intervals along the drum from the inlet to the outlet. This is attained by having the baffles 31 set annularly in transverse planes that are in general wholly in a plane at right angles to the longitudinal axis of rotation of the drum, rather than at an acute angle, such as a spiral or serpentine baffle as in a customary balling drum or pugging drum.

In movable grate sintering, it is most desirable to have a high bed permeability as high as is possible in order to promote the highest possible amount of draft as well as uniform distribution of that draft. One of the most important factors which influence bed permeability is the sizing of the feed to the sinter strand. Naturally, the larger and more uniform the sizing of the feed, the more open and permeable will be the bed.

It is evident that the mixing and preparation of the feed for a sintering machine is of vital importance to the whole sintering operation. In most movable grate sintering operations, the raw materials are mixed with the proper amount of water in either a balling drum, a pugging drum, or on a disc pelletizer. In all cases, the principal object is to produce pellets or balls of the raw material which are as uniform in size as is possible, in order to have uniform air flow for uniform sintering.

The balling drum or pugging drum are much the same in operation, in that they both depend upon the tumbling action of a revolving drum to mix and ball up the material during its passage through the drum. In the pugging drum, rotating paddles are also provided to further insure adequate mixing of the raw material and to move it through the drum.

The pelletizing disc is nothing more than an inclined revolving disc equipped with plows. The dry material is charged to the center of the disc and as it moves toward the outside, is mixed with water and balled up.

The conventional balling drum or pugging mill has several advantages over the pelletizing disc, most particularly, their higher throughput capacity. They have one great disadvantage, however, in that neither produce pellets of uniform size, making it sometimes necessary to screen out the fines in order to promote maximum bed permeability. The disc pelletizer is capable of producing pellets of more or less uniform size without screening. In addition to being of low capacity, the disc is mounted on a single central spindle and, because of the high rotating speeds, maintenance costs are much higher than those for a balling or pugging drum.

With the disc pelletizer, the revolution of the disc, plus the scraping action of the plow, causes the tumbling action that is conducive to good balling. As the balls increase in size and weight, centrifugal force tends to throw them toward the outside rim while the fines continue to remain in about the same location or even tend to move toward the center. Gradually, the formed balls reach sufficient size and weight that they move to the edge of the disc and are discharged over the rim. The diameter of the disc, its angle of inclination, and its speed of revolution, can be suitably adjusted to control the degree of balling that is attained. In essence, all that the adjustment of these variables does is to change the retention time on the disc. The ability to control retention time, plus the particular type of tumbling action that is induced by the revolution of the disc, is felt to be the reason for the superior action of a disc pelletizer as compared to a conventional balling drum without baffles.

The employment of baffles 31 at right angles to the general line of the axis of rotation of the drum 10, with the baffles 31 disposed annularly at spaced intervals along the inner surface 11 of the drum, results in the baffles 31 in the drums retarding the flow of material and inducing sufficient tumbling action as in the disc pelletizer, that is, to ball the material to the desired predetermined condition most suitable for sintering on a movable grate, while at the same time attaining the characteristic higher throughput or capacity of the ordinary balling drum or pugging drum without baffles, or with baffles in a spiral plane which tend to favor the flow of fines through the drum.

Thus, the material is made to flow through a number of, for instance six, psuedo disc pelletizers 31 as it passes through the drum. Observation of the material during actual operation of the drum, tends to show that the action is like that of a disc pelletizer. That is, as the material enters a baffle section 31, the larger, heavier balls rapidly roll down the inclined drum surface or an inclined deflector plate 32, when employed between each two baffles 31, to be discharged into the next section 31 while the fines continue to move much more slowly down the inclined surface 32 and sometimes even appear to move back up such inclined surface 32.

With this Stirling drum system it is possible to achieve, in an inclined drum without recycling of fines, the same satisfactory balling action for sintering machines, with one type of sinterable material, but not with various other types of sinterable material, as is obtained with a series of conventional disc pelletizers but with the same higher capacity or throughput with recycling of fines, as in the conventional balling drums and pugging drums, with a retention time of 60–90 seconds. This was done with the baffles 31 spaced equally distant from each other along the inclined drum at succeeding 24 inch intervals and with the baffles 31 all of equal height of 3 inches each, and in a commercial installation, the downdraft section in a sintering machine was increased from 35 to 38 inches of water prior to the installation of the 3 inch high baffles to 25 to 27 inches of water with the aforementioned baffles equally spaced at 24 inch intervals.

With the various other types of sinterable material, it was found that with the drum operating in either an inclined or horizontal position, the balls produced were of more fragile nature and tended to disintegrate in flowing over the baffles, resulting in an excessive amount of fines for low bed permeability on the sintering machine, and made recycling of fines necessary to achieve the aforesaid full rate of capacity. In order to overcome the excessive production of fines and to avoid the difficulties and disadvantages of recycling the fines, it was first found this could be achieved in part with these other materials by means of the deflector 32 between the downstream sides 33 of the baffle 31 and a lower region of the upstream side 34 of each baffle 31, as shown on the drawing. It was ascertained that the deflectors would aid in reducing the amount of fines formed which must be recycled since, when optimum moisture for optimum balling was added, it was found, that as the formed pellets flowed over the baffles 31 without the deflectors, there was a slight breakdown of pellets as a result of the fall. This partial degradation of the pellets is overcome by the deflector plates 32 on the downstream sides 33 of the baffles.

The baffles 31, when increased in height, are arranged so that they decrease in height about one-half inch each progressively from the feed inlet end 14 of the drum 10 to the discharge outlet end 16 of the drum, and the baffles 31 are spaced apart from each other lengthwise of the drum 11 in decreasing amounts, such as those indicated on the drawing, from feed inlet end 14 to the discharge outlet end 16. The angle of inclination 35 at which the deflectors 32 are set in relation to the drum inner circumference 11 is between 25° and 50°. With this arrangement of these parts and the coaction of the scrapers 13, and the scoops 19A, the formation from the aforesaid excessively wet material or a sticky mix of firm coherent nodules of the desired uniform size and degree of permeability for sinering machine gases, is maintained at the same full rate of capacity without buildup of material in the feed end 14 and to be screened out from the finished nodules before delivery to the belt 22 for sintering, and then recycled back in at 14 to maintain the full-rated production of these machines as heretofore devised for the same purpose of continuously supplying nodules for sintering on continuous sinter strand types of ore pellet sintering machines. Such novel arrangement of cheese cutter type scraper parts with the drum is also of like utility for forming pellets for sintering fly ash and glass grinding waste effluent. The combination of such cheese cutter type scraper parts with the right angle baffles and downstream deflectors pitched at 25°–50°, has been found to be the best mode of construction, not only because balling is satisfactory with both coarse and fine materials, as well as the aforesaid excessively wet material or a sticky mix, but also because it is possible to produce a satisfactory product while operating in the horizontal position, which is more advantageous than operation in the inclined positon at an angle to the vertical, since the latter involves special engineering and construction to accommodate the thrust on thrust bearings at the lower end of the drum to minimize maintenance and upkeep costs on the driving mechanism.

The balls produced are all of such uniform size that no screening out of fines is necessary, as has been the case with other types of balling drums. The production rate is maintained without resort to recycling of fines for "seeding" of pellets. Production rates up to 1.0 ton per hour per square foot of drum surface are attainable, but a rate between 0.6 and 0.8 ton per hour per square foot of drum surface is deemed to be the rate at which optimum balling takes place. The product produced is one in which its layer permeability is such that in a 12 inch pot test the average air flow increased from 81.5 cu. ft. per minute for material prepared in a conventional balling drum without baffles to 108.2 cu. ft. per minute for the same material prepared in the drum of this invention with the variously spaced sloping deflectors. This increase in air flow by 32.7% is indicative of the increased permeability that is achieved through the use of the balling drum improved as described above.

In operation with excessively wet material or a sticky mix, as well as glass grinding effluent material, fly ash, and iron ore concentrates, the material in the wet condition for balling is fed from the belt 21 into the chute 14 which flows the wet material onto the first deflector 32 during rotation of the drum. The material tumbles there as is a disc pelletizer until it balls up to sizes large enough to flow over the radial baffles 31, whence it descends by gravity along the next deflector, and so on through all sections 31. The retention time of the fines is long enough in the forepart areas so that the amount of fines decrease from section to section until the last section passes only nodules devoid of loose fines. The dimensions of the drum, its speed of rotation, its degree of inclination, and type, size, and spacing, and height of the baffles 31, are all variable, depending upon the desired throughput capacity and balling characteristics of the particular materials to be processed. The general operating principle of any modification of the drum is that the baffles are so designed and located to retard the flow of material and induce sufficient tumbling action to ball the material to the desired predetermined condition that is most suitable for sintering on a movable grate.

With the present improvement for use of the Stirling system with the wetter material or sticky mix, the cheese cutter type of scrapers 13 do not collect the scraped material, but it falls freely to the lower part of the drum as fast as the material is scraped from the upstream sides of the baffles and from the inner faces of the annular conical deflectors.

With the drum rotating clockwise as viewed in Figure I, looking from the direction of the feed end along the sectional line III—III, the scrapers 13 are mounted to scrape in the position between nine o'clock and twelve o'clock (i.e., 270°–360° from the vertical), preferably between ten o'clock and eleven o'clock.

The deflector scrapers 13 are disposed at an angle to conform with deflectors 32, and the scoops 19A cause the scraped and pelletized material to move forward downstream in the drum, as the material falls to the lower rolling pelletizing area in the drum to maintain the continuity of flow at the desired throughput as shown in the Stirling system.

The scrapers 13 are mounted for scraping in a direction opposite to the direction of rotation of the drum, within the region of the drum between 270° and 360° from the top of the drum, and preferably, in the 300°–330° sector, to insure fall of only small, rather than very large, lumps or particles into the pelletizing area 12 of the drum.

I claim:

1. In balling drum apparatus for agglomerating substantially spherical bodies of predetermined size from wet finely-divided material devoid of, or with, binder other than water, comprising: a drum mounted for rotation about its longitudinal axis in a plane at an angle to the vertical; means for suplying material into one end of the drum during rotation thereof; means for withdrawing nodules of said material from the opposite end of said drum rotation thereof; radially extending annular baffles projecting inwardly, at spaced intervals along the drum from the inner circumference thereof towards its longitudinal axis of rotation with each baffle in a plane at a right angle to said axis to provide retardation of the flow of fine material along the length of the drum; annular deflectors each disposed on an incline from a region closer to the axis of rotation on the downstream side of each baffle to a point more remote from said axis on the upstream side of a next baffle in the direction of the discharge end of the drum, with the deflectors inclined between the baffles with a pitch within the range of 25° and 50°; and scoops in scooping relation in the spaces between the baffles for overflow of nodules over the baffles, the improvement comprising: scrapers in individual immovable scraping relation with the respective spaces between the baffles at the feed end of the drum, for causing excess material on the individual annular deflectors between said baffles to drop and roll in the drum, said scrapers each corresponding in length, and in angle of inclination, to its individual annular deflector and each being supported immovably in said operative relation, from a common support extending longitudinally of the drum interior, through secondary support means, each extending individually from the common support transversely out to the respective scrapers and each of a width, lengthwise of the drum, that is but a minor portion of the length of its scraper, to minimize resistance from material scraped off from the annular deflectors by the scrapers, and to avoid buildup of the scraped material on the scrapers.

2. Apparatus as claimed in claim 1 and in which the scrapers are mounted to scrape in the opposite direction to the direction of rotation of the drum, between 270° and 360° from the top of the drum.

3. Apparatus as claimed in claim 2 and in which the scrapers are located in the 300°–330° sector, to insure fall of only small particles into the pelletizing area.

4. Apparatus as claimed in claim 1 and in which the secondary support means for the scrapers comprise arms disposed at the opposite longitudinal ends of each scraper, with one arm in scraping relation alongside the upstream side of the baffle at the downstream end of the inclined deflectors, and with both arms adjustably mounted on the common support.

5. Apparatus as claimed in claim 1 and in which the annular deflectors are each disposed at a 34° pitch.

6. Apparatus as claimed in claim 1 and in which the spaces between the baffles decrease progressively from the feed end to the discharge end of the drum.

References Cited in the file of this patent

UNITED STATES PATENTS

| | | |
|---|---|---|
| 985,602 | Jones | Feb. 28, 1911 |
| 1,931,499 | Klugh | Oct. 24, 1933 |
| 2,172,638 | Hermann | Sept. 12, 1939 |
| 2,311,154 | Carney | Feb. 16, 1943 |
| 2,711,557 | Russell | June 28, 1955 |
| 2,831,210 | DeVaney | Apr. 22, 1958 |
| 2,920,344 | Stirling | Jan. 12, 1960 |

FOREIGN PATENTS

| | | |
|---|---|---|
| 181,807 | Austria | Apr. 25, 1955 |